W. CABLE.
Improvement in the Manufacture of India Rubber Cloth Goods.
No. 124,542.                                                                    Patented March 12, 1872.
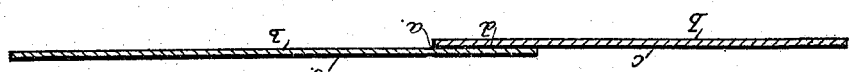
Witnesses.
Chas J Burns
J. P. McElroy.
Inventor.
Wheeler Cable
pr. Brown Bros.
Attorneys.

124,542

UNITED STATES PATENT OFFICE.

WHEELER CABLE, OF BOSTON, MASSACHUSETTS.

IMPROVEMENT IN THE MANUFACTURE OF INDIA-RUBBER-CLOTH GOODS.

Specification forming part of Letters Patent No. 124,542, dated March 12, 1872.

*To all to whom these presents shall come:*

Be it known that I, WHEELER CABLE, of Boston, in the county of Suffolk and State of Massachusetts, have invented a certain new and useful Improvement in the Manufacture of India-Rubber-Cloth Goods; and that the following is a full, clear, and exact description of the same, reference being had to the occompanying drawing forming a part thereof.

As is well known in the manufacture of India-rubber-cloth goods, the cloth, in a continuous sheet form, is coated with India-rubber, and then the rubber surfaced with an asphaltum or shellac varnish, if luster goods, or with flour, if dull goods are to be made from it, this surfacing of the rubber being done to remove the sticky feeling of the rubber, rendering the cloth sheets fit for handling when cut up and made into goods. This surface of the rubber to the cloth sheet at such points as are to be overlapped to make a seam, in the manufacture of the cloth into goods, has to be removed before the portions to overlap can be stuck together and the seam closed, and upon the degree to which it is removed without removing the rubber or incorporating the varnish or flour, as the case may be, with the rubber, as is well known, depends the quality and strength of the seam joint. This removal of the flour or varnish surface is accomplished by the application and rubbing of naphtha or benzine over the same; and in their use experience shows that more or less of the varnish or flour is not removed, but rubbed into and incorporated with the rubber, and that the rubber is to a considerable extent removed; the removal of the rubber being caused more from the fact that so much rubbing is necessary to get off the varnish or flour than from the use of benzine or naphtha, well-known solvents of rubber. This, as is obvious, destroys in a great measure the adhesive power of the rubber to secure the two parts of the seam, and from use, wear, and handling of the goods the seams most frequently open and separate.

The object of this invention, and which by practice and use is demonstrated to be most satisfactorily obtained, is to impart a surface to the India rubber of the cloth, to counteract its stickiness while being handled to be cut up and made into goods, that, with the use of naphtha or benzine as ordinarily or any other suitable material can be so readily and quickly removed as in no degree, and if in any, to a very slight degree, to incorporate it with or to remove the rubber. For this purpose the invention consists in overcoming the "stickiness" of the rubber to the cloth by the application thereto of a wash of soap—as, for instance, Castile soap—preferably applied in a state of solution with the use of a sponge or other means, although it can be pulverized, and being sprinkled over the surface, then, with a sponge moistened with water, dissolved by passing the sponge over the rubber.

Soap applied as described or in any suitable way, by practice is found to completely neutralize the "stickiness" of the rubber, and with the after application of benzine or naphtha to be instantly taken up and absorbed without removing the rubber, but leaving it intact, and with its original adhesive or sticky power, thereby enabling most perfect seams to be made.

Castile soap has been found to be most advantageous, but it is not intended to limit the invention to the use of any particular kind of soap.

It may be well to here observe that the soaped rubber surface can, after the manufacture of the cloth into goods, be varnished with shellac or asphaltum varnish to produce luster goods, or floured, as heretofore, for dull goods.

In the accompanying plate the sectional view of two sheets of rubber cloth seamed shows at *a* the line of seam; *b* being the cloth, *c* the rubber applied thereto, and *d* the portion of its surface from which the soap-surface is removed to make the seam.

Having thus described my invention, what I claim, and desire to secure by Letters Patent, is—

In the manufacture of India-rubber-cloth goods, I claim the application of soap, substantially as and for the purpose described.

The above specification of my invention signed by me this 26th of January, A. D. 1872.

WHEELER CABLE.

Witnesses:
 EDWIN W. BROWN,
 ALBERT W. BROWN.